United States Patent
Aoki et al.

(10) Patent No.: US 10,291,837 B2
(45) Date of Patent: May 14, 2019

(54) IMAGING DEVICE AND FOCUSING CONTROL METHOD

(71) Applicant: FUJIFILM Corporation, Tokyo (JP)

(72) Inventors: Takashi Aoki, Saitama (JP); Yasuo Ohtsuki, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/260,768

(22) Filed: Sep. 9, 2016

(65) Prior Publication Data

US 2016/0381285 A1 Dec. 29, 2016

Related U.S. Application Data

(63) Continuation of application No. PCT/JP2015/050884, filed on Jan. 15, 2015.

(30) Foreign Application Priority Data

Mar. 25, 2014 (JP) ................................. 2014-062192

(51) Int. Cl.
*H04N 5/232* (2006.01)
*H04N 5/225* (2006.01)
(Continued)

(52) U.S. Cl.
CPC ....... *H04N 5/23212* (2013.01); *H04N 5/2254* (2013.01); *H04N 5/232* (2013.01);
(Continued)

(58) Field of Classification Search
CPC .. H04N 5/23212; H04N 5/232; H04N 5/2254; H04N 9/045; G02B 7/28; G02B 7/34; G02B 7/346
See application file for complete search history.

(56) References Cited

U.S. PATENT DOCUMENTS

| | | | |
|---|---|---|---|
| 9,048,152 B2* | 6/2015 | Kishi | ........................ G02B 7/34 |
| 2010/0245631 A1* | 9/2010 | Hoda | ..................... G03B 13/36 |
| | | | 348/241 |

(Continued)

FOREIGN PATENT DOCUMENTS

| | | |
|---|---|---|
| JP | 2009-141390 A | 6/2009 |
| JP | 2011-44820 A | 3/2011 |

(Continued)

OTHER PUBLICATIONS

International Preliminary Examination Report for PCT/JP2015/050884 (PCT/IPEA/409) completed on Jun. 22, 2016.

(Continued)

*Primary Examiner* — Luong T Nguyen
(74) *Attorney, Agent, or Firm* — Birch, Stewart, Kolasch & Birch, LLP

(57) ABSTRACT

A digital camera includes an imaging element (5) having an imaging surface (50) where pixels (51) are arranged in two dimensions in a row direction X and in a column direction Y, an AF processing unit (19) that determines whether a focus lens is in a focused state using detection signals obtained from respective pixels (51) of a first pixel group including plural pixels (51) arranged in the row direction X and a second pixel group including pixels (51) arranged at the same distance in one direction that crosses the row direction X with respect to each of the plural pixels (51) of the first pixel group, in a state where the focus lens is at an arbitrary position, and a system control unit (11) that moves the focus lens until the AF processing unit (19) determines that the focus lens is in the focused state.

6 Claims, 16 Drawing Sheets

(51) Int. Cl.
*H04N 9/04* (2006.01)
*G02B 7/28* (2006.01)
*G02B 7/34* (2006.01)

(52) U.S. Cl.
CPC ............... *H04N 9/045* (2013.01); *G02B 7/28* (2013.01); *G02B 7/346* (2013.01)

(56) References Cited

U.S. PATENT DOCUMENTS

| | | | |
|---|---|---|---|
| 2012/0293706 A1* | 11/2012 | Usui ...................... | H04N 5/335 348/345 |
| 2013/0021519 A1* | 1/2013 | Hamada ................. | G03B 13/36 348/349 |
| 2013/0076972 A1* | 3/2013 | Okita ................. | H04N 5/23212 348/360 |
| 2013/0182140 A1* | 7/2013 | Yasuda .................... | G02B 7/09 348/222.1 |
| 2014/0146218 A1* | 5/2014 | Kunieda ............ | H04N 5/23212 348/345 |
| 2014/0198239 A1* | 7/2014 | Suzuki ............... | H04N 5/23212 348/246 |

FOREIGN PATENT DOCUMENTS

| | | |
|---|---|---|
| JP | 2012-108201 A | 6/2012 |
| JP | 2013-190734 A | 9/2013 |

OTHER PUBLICATIONS

International Search Report for PCT/JP2015/050884 (PCT/ISA/210) dated Apr. 21, 2015.
Written Opinion of the International Searching Authority for PCT/JP2015/050884 (PCT/ISA/237) dated Apr. 21, 2015.
Japanese Office Action for Japanese Application No. 2016-510071, dated Nov. 15, 2016, with an English translation.
Chinese Office Action and Search Report, dated Apr. 3, 2018 for corresponding Chinese Application No. 201580015810.7, with an English translation of the Chinese Office Action.
Chinese Office Action and Search Report dated Nov. 23, 2018, for corresponding Chinese Application No. 201580015810.7, with an English translation of the Chinese Office Action.

* cited by examiner

IMAGING DEVICE AND FOCUSING CONTROL METHOD

CROSS REFERENCE TO RELATED APPLICATIONS

This application is a Continuation of PCT International Application No. PCT/JP2015/050884 filed on Jan. 15, 2015, which claims priority under 35 U.S.C. § 119(a) to Patent Application No. 2014-062192 filed in Japan on Mar. 25, 2014, all of which are hereby expressly incorporated by reference into the present application.

BACKGROUND OF THE INVENTION

1. Field of the Invention

The present invention relates to an imaging device and a focusing control method.

2. Description of the Related Art

In recent years, according to the increase in resolution of a solid-state imaging element such as a charge coupled device (CCD) image sensor or a complementary metal oxide semiconductor (CMOS) image sensor, demand for information devices having an imaging function, such as a digital still camera, a digital video camera, a mobile phone such as a smart phone, or a personal digital assistant (PDA) has rapidly increased. Such an information device having an imaging function is referred to as an imaging device.

In such an imaging device, as a focusing control method for focusing on a main subject, a contrast auto-focus (AF) method or a phase difference AF method (for example, see JP2013-190734A and JP2009-141390A) is employed. Since the contrast AF method and the phase difference AF method respectively have specific advantages, an imaging device that uses both the methods in combination has also been proposed.

SUMMARY OF THE INVENTION

It is known that the phase difference AF method has an advantage of being capable of performing focusing at high speed, but has low focusing accuracy with respect to a low brightness subject or a high frequency subject. The contrast AF method is able to perform focusing with high accuracy with respect to a low brightness subject or a high frequency subject. However, since it is necessary to calculate a peak of contrast evaluation values by performing imaging plural times while moving a focus lens, it is necessary to move the focus lens forward and backward in a wide range, which takes time for completion of focusing.

In an imaging device that uses the contrast AF method and the phase difference AF method in combination, it is possible to employ an optimal method according to subjects to perform focusing. However, in order to employ the phase difference AF method, it is necessary to provide phase difference detection pixels in an imaging element, or to provide a dedicated sensor for distance measurement in a device, which causes an increase in the cost of the imaging device. Further, in a case where the phase difference detection pixels are provided in the imaging element, when generating captured image data, it is necessary to generate detection signals of the phase difference detection pixels in an interpolating manner. If the number of phase difference detection pixels increases, correction marks increase in number, which causes deterioration in image quality.

The imaging device disclosed in JP2013-190734A and JP2009-141390A performs a focusing control based on a result of a correlation operation with respect to a detection signal of one phase difference detection pixel in a pair of phase difference detection pixels and a detection signal of an imaging pixel. According to such an imaging device, although the number of phase difference detection pixels is reduced, the phase difference detection pixels are still present, and the above-mentioned problems occur.

In order to solve the above-mentioned problems, an object of the invention is to provide an imaging device and a focusing control method capable of performing a focusing control without using phase difference detection pixels and without employing a contrast method.

According to an aspect of the invention, there is provided an imaging device comprising: an imaging element that includes an imaging surface where signal detection units that detect a signal based on a beam that passes through a pupil region of an imaging optical system that includes a focus lens are arranged in two dimensions in a row direction and a column direction that is orthogonal to the row direction; a focusing determination unit that determines whether the focus lens is in a focused state based on correlation values between a detection signal group of a first signal detection unit group that includes the plurality of signal detection units arranged in the row direction and a detection signal group of a second signal detection unit group that includes the signal detection units arranged at the same distance in one direction that crosses the row direction with respect to each of the plurality of signal detection units, in a state where the focus lens is at an arbitrary position, and based on a predetermined threshold value; and a focusing control unit that moves the focus lens until it is determined by the focusing determination unit that the focus lens is in the focused state.

According to another aspect of the invention, there is provided a focusing control method in an imaging device including an imaging element that includes an imaging surface where signal detection units that detect a signal based on a beam that passes through a pupil region of an imaging optical system that includes a focus lens are arranged in two dimensions in a row direction and a column direction that is orthogonal to the row direction, the method comprising: a focusing determination step of determining whether the focus lens is in a focused state based on correlation values between a detection signal group of a first signal detection unit group that includes the plurality of signal detection units arranged in the row direction and a detection signal group of a second signal detection unit group that includes the signal detection units arranged at the same distance in one direction that crosses the row direction with respect to each of the plurality of signal detection units, in a state where the focus lens is at an arbitrary position, and based on a predetermined threshold value; and a focusing control step of moving the focus lens until it is determined in the focusing determination step that the focus lens is in the focused state.

According to the invention, it is possible to provide an imaging device and a focusing control method capable of performing a focusing control without using phase difference detection pixels and without using a contrast method.

DESCRIPTION OF THE PREFERRED EMBODIMENTS

Hereinafter, embodiments of the invention will be described with reference to the accompanying drawings.

Figure 1:
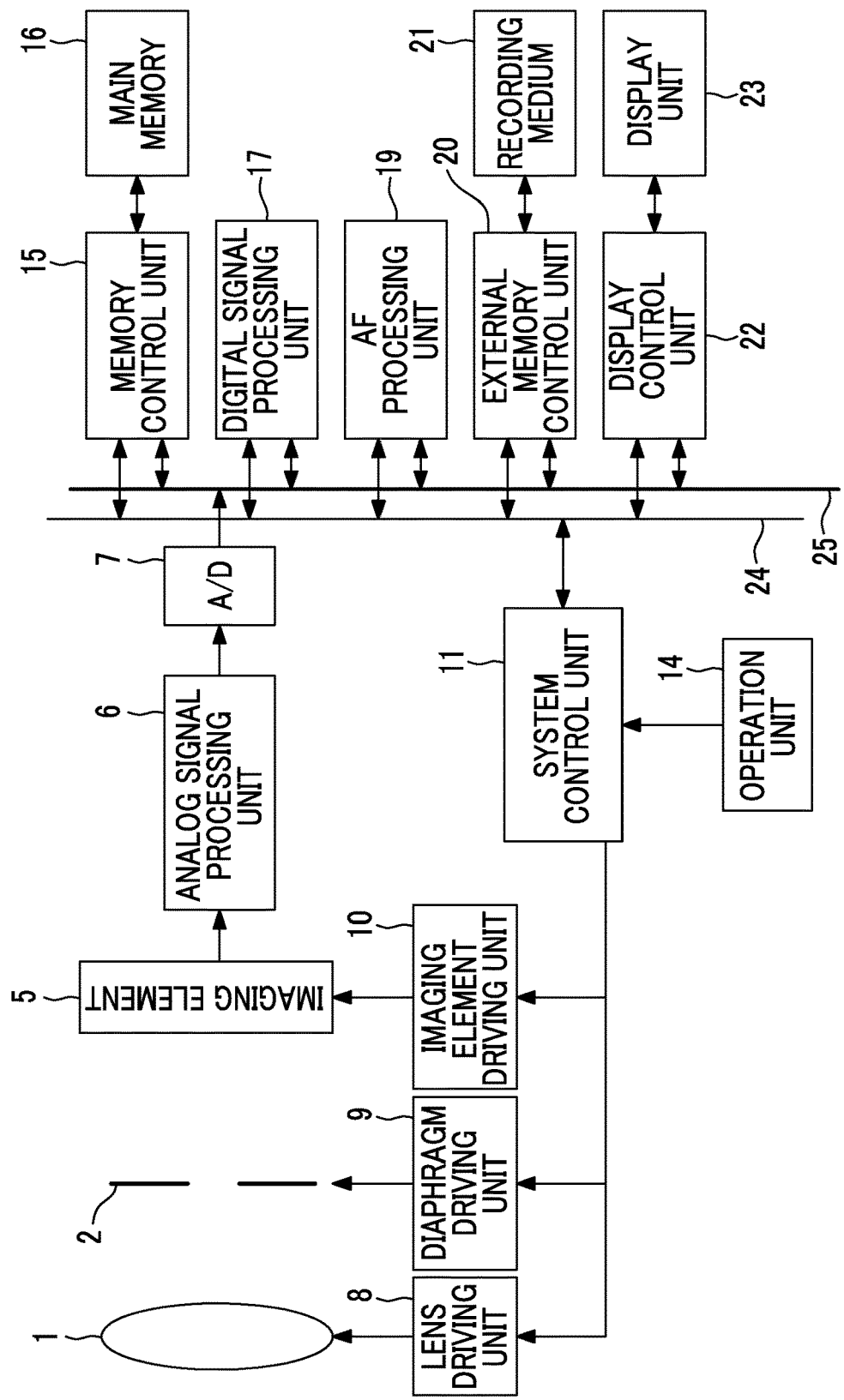
FIG. 1 is a diagram illustrating a schematic configuration of a digital camera which is an example of an imaging device for describing an embodiment of the invention.

FIG. 1 is a diagram illustrating a schematic configuration of a digital camera which is an example of an imaging device for describing an embodiment of the invention.

The digital camera shown in FIG. 1 comprises a lens device that includes an imaging lens 1 that includes a focus lens for focus adjustment, a zoom lens, or the like and a diaphragm 2. The lens device forms an imaging optical system.

The lens device may be fixed to a camera main body, or may be exchanged with another lens device. It is sufficient if the imaging lens 1 includes at least the focus lens. The focus lens may perform focus adjustment by moving the entirety of the lens system.

The digital camera comprises an imaging element 5 of a CCD type, a CMOS type, or the like that images a subject through the lens device, an analog signal processing unit 6 that is connected to an output end of the imaging element 5 and performs analog signal processing such as a correlated double sampling process, and an A/D conversion circuit 7 that converts an analog signal output from the analog signal processing unit 6 into a digital signal.

The analog signal processing unit 6 and the A/D conversion circuit 7 are controlled by a system control unit 11. The analog signal processing unit 6 and the A/D conversion circuit 7 may be provided in the imaging element 5.

The system control unit 11 that generally controls the entirety of an electric control system of the digital camera performs a focusing control for controlling a lens driving unit 8 and driving the focus lens included in the imaging lens 1 to be focused on a main subject, or adjusts the position of the zoom lens included in the imaging lens 1. Further, the system control unit 11 controls the degree of opening of the diaphragm 2 through a diaphragm driving unit 9 to adjust a light exposure value.

Further, the system control unit 11 drives the imaging element 5 through an imaging element driving unit 10, and outputs a subject image captured through the imaging lens 1 as a captured image signal. An instruction signal from a user is input to the system control unit 11 through an operation unit 14. The instruction signal includes an instruction signal for instructing execution of a focusing control of the imaging optical system.

Further, the electric control system of the digital camera comprises a main memory 16, a memory control unit 15 connected to the main memory 16, a digital signal processing unit 17 that generates captured image data by performing an interpolation operation, a gamma correction operation, a RGB/YC conversion process, and the like with respect to a captured image signal output from the A/D conversion circuit 7, a phase difference AF processing unit 19, an external memory control unit 20 to which a detachable recording medium 21 is connected, and a display control unit 22 to which a display unit 23 mounted on a rear surface or the like of the camera is connected.

The memory control unit 15, the digital signal processing unit 17, the phase difference AF processing unit 19, the external memory control unit 20, and the display control unit 22 are connected to each other through a control bus 24 and a data bus 25, and are controlled by instructions from the system control unit 11.

Figure 2:
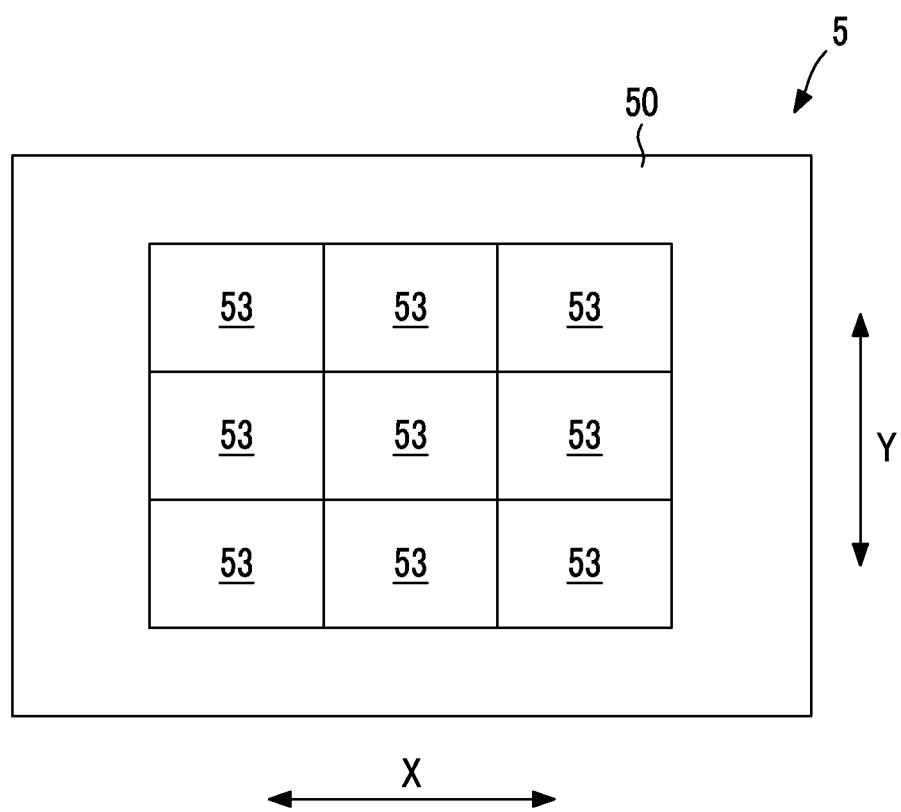
FIG. 2 is a schematic plan view illustrating an overall configuration of an imaging element 5 mounted on the digital camera shown in FIG. 1.

FIG. 2 is a schematic plan view illustrating an overall configuration of the imaging element 5 mounted on the digital camera shown in FIG. 1.

The imaging element 5 includes an imaging surface 50 on which multiple pixels 51 are arranged in two dimensions in a row direction X and in a column direction Y orthogonal thereto. Each pixel 51 is a signal detection unit that receives a beam that passes through a pupil region of the imaging lens 1, and detects a signal depending on the intensity of received light. In the example of FIG. 2, nine AF areas 53 which are target areas for focusing are provided on the imaging surface 50.

Figure 3:
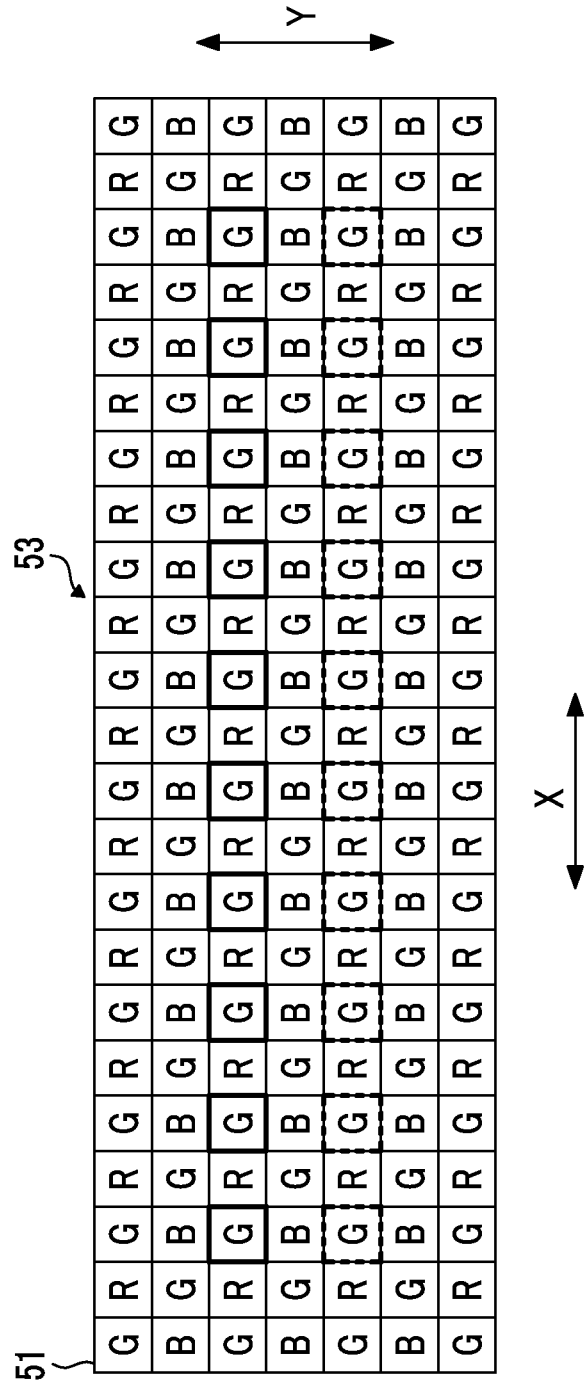
FIG. 3 is a diagram illustrating a configuration of one block that forms one AF area 53 shown in FIG. 2.

FIG. 3 is a diagram illustrating one block of one AF area 53 shown in FIG. 2. The AF area 53 has a configuration in which plural blocks shown in FIG. 3 are arranged in the column direction Y. It is sufficient if at least one block is present in the AF area 53.

In the block of the AF area 53, pixels 51 (indicated by squares with R, G, and B in the figure) are arranged in two dimensions. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The color filters are arranged in the form of a Bayer array over the entirety of the imaging surface 50.

In the block of the AF area 53, detection signals of respective pixels of a first signal detection unit group including plural G pixels 51 (pixels 51 surrounded by thick solid lines in FIG. 3) arranged in the row direction X at a predetermined pitch and a second signal detection unit group including G pixels 51 (pixels 51 surrounded by thick dotted-lines in FIG. 3) respectively arranged at the same distance in a direction (column direction Y in the example of FIG. 3) that crosses the row direction X with respect to the plural G pixels 51 are used for determining whether the focus lens is in a focused state.

The AF processing unit 19 shown in FIG. 1 determines whether the focus lens is in a focused state using detection signals obtained from the respective G pixels 51 of the first signal detection unit group and the second signal detection unit group in a state where the focus lens is at an arbitrary position (whether a current position of the focus lens is at a focusing position). The AF processing unit 19 functions as a focusing determination unit.

If an auto focus execution instruction is given, the system control unit 11 shown in FIG. 1 controls the position of the focus lens. The system control unit 11 moves the focus lens in one direction along an optical axis direction by a minimum movable distance. Further, if it is determined that the focus lens is in the focused state, the AF processing unit 19 stops a position control of the focus lens, sets a current position of the focus lens as the focusing position, and then, completes auto focusing. The system control unit 11 functions as a focusing control unit.

Hereinafter, a method for calculating whether the focus lens is in the focused state will be described in detail.

The AF processing unit 19 performs a correlation operation with respect to a detection signal group of the first signal detection unit group and a detection signal group of the second signal detection unit group. That is, the AF processing unit 19 calculates correlation values between the detection signal group of the first signal detection unit group and the detection signal group of the second signal detection unit group while shifting the detection signal group of the first signal detection unit group and the detection signal group of the second signal detection unit group by an arbitrary amount in the row direction X. Further, the AF processing unit 19 calculates a determination value J for determining whether the focus lens is in the focused state using the calculated correlation values.

Specifically, when data on the detection signal group of the first signal detection unit group is represented as A[1], . . . , A[k] and data on the detection signal group of the second signal detection unit group is represented as B[1], B[k], an area C[d] surrounded by two data waveforms obtained by the following Expression (1) when the two pieces of data are shifted by a shift amount "d" is calculated as a correlation value.

$$C[d] = \sum_{n=1}^{k} (A[n+d] - B[n])^2 \quad (1)$$

$$d = -L, \cdots, -2, -1, 0, 1, 2, \cdots, L$$

Figure 4:
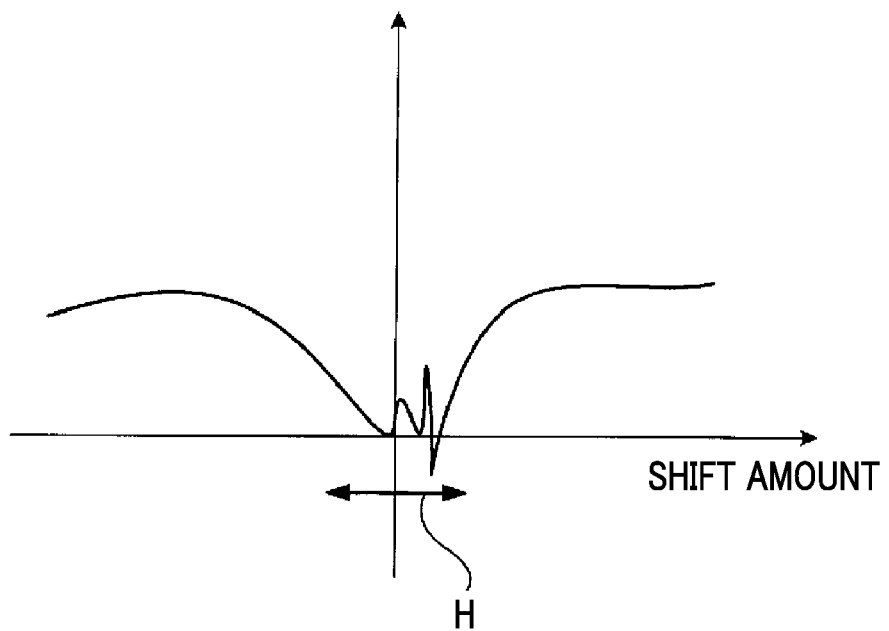
FIG. 4 is a diagram illustrating a correlation operation result in a state where a focus lens is at a focusing position.

FIG. 4 is a diagram illustrating a result of a correlation operation with respect to the detection signal group of the first signal detection unit group and the detection signal group of the second signal detection unit group in a state where the focus lens is in the focused state.

The transverse axis of FIG. 4 represents a shift amount of the detection signal group of the first signal detection unit group and the detection signal group of the second signal detection unit group in the row direction X. The longitudinal axis of FIG. 4 represents a correlation value between the detection signal group of the first signal detection unit group and the detection signal group of the second signal detection unit group.

The first signal detection unit group and the second signal detection unit group are shifted by two pixels in the column direction Y, and thus, do not form completely the same subject image. Accordingly, even when the shift amount of the detection signal group of the first signal detection unit group and the detection signal group of the second signal detection unit group is 0, the correlation value between the detection signal group of the first signal detection unit group and the detection signal group of the second signal detection unit group does not become 0, but becomes a minimum value.

However, in a state where the focus lens is in the focused state, an image formed in the first signal detection unit group and an image formed in the second signal detection unit group become sharp. Thus, a fine difference between the image formed in the first signal detection unit group and the image formed in the second signal detection unit group appears as a correlation value. Accordingly, as shown in FIG. 4, a distribution of correlation values corresponding to respective shift amounts in a range H including a shift amount of 0 becomes large.

Figure 5:
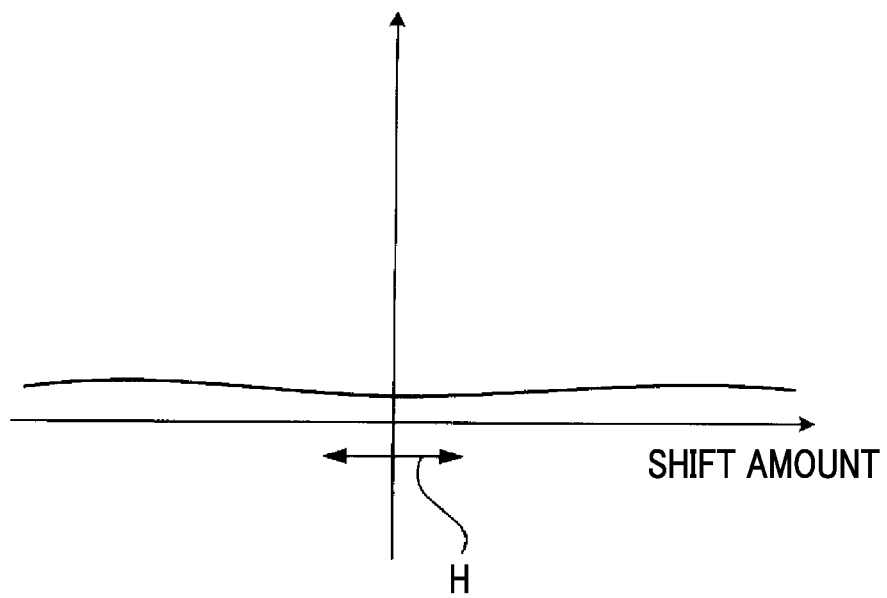
FIG. 5 is a diagram illustrating a correlation operation result in a state where a focus lens is not at a focusing position.

FIG. 5 is a diagram illustrating a result of a correlation operation with respect to the detection signal group of the first signal detection unit group and the detection signal group of the second signal detection unit group in a state (not-focused state) where the focus lens is not in the focused state.

In a state where the focus lens is not at the focusing position, the image formed in the first signal detection unit group and the image formed in the second signal detection unit group are blurred. Thus, a difference between the image formed in the first signal detection unit group and the image formed in the second signal detection unit group does not easily appear, and thus, a correlation value becomes a value close to 0. Accordingly, as shown in FIG. 5, a distribution of correlation values corresponding to shift amounts in the range H becomes small.

In view of these points, the AF processing unit 19 can determine whether the focus lens is in the focused state according to the size of the distribution of the correlation values corresponding to the respective shift amounts in the range H.

The distribution of the correlation values corresponding to the respective shift amounts in the range H may be calculated by a variance or a standard deviation of the correlation values corresponding to the respective shift amounts in the range H, for example.

Figure 6:
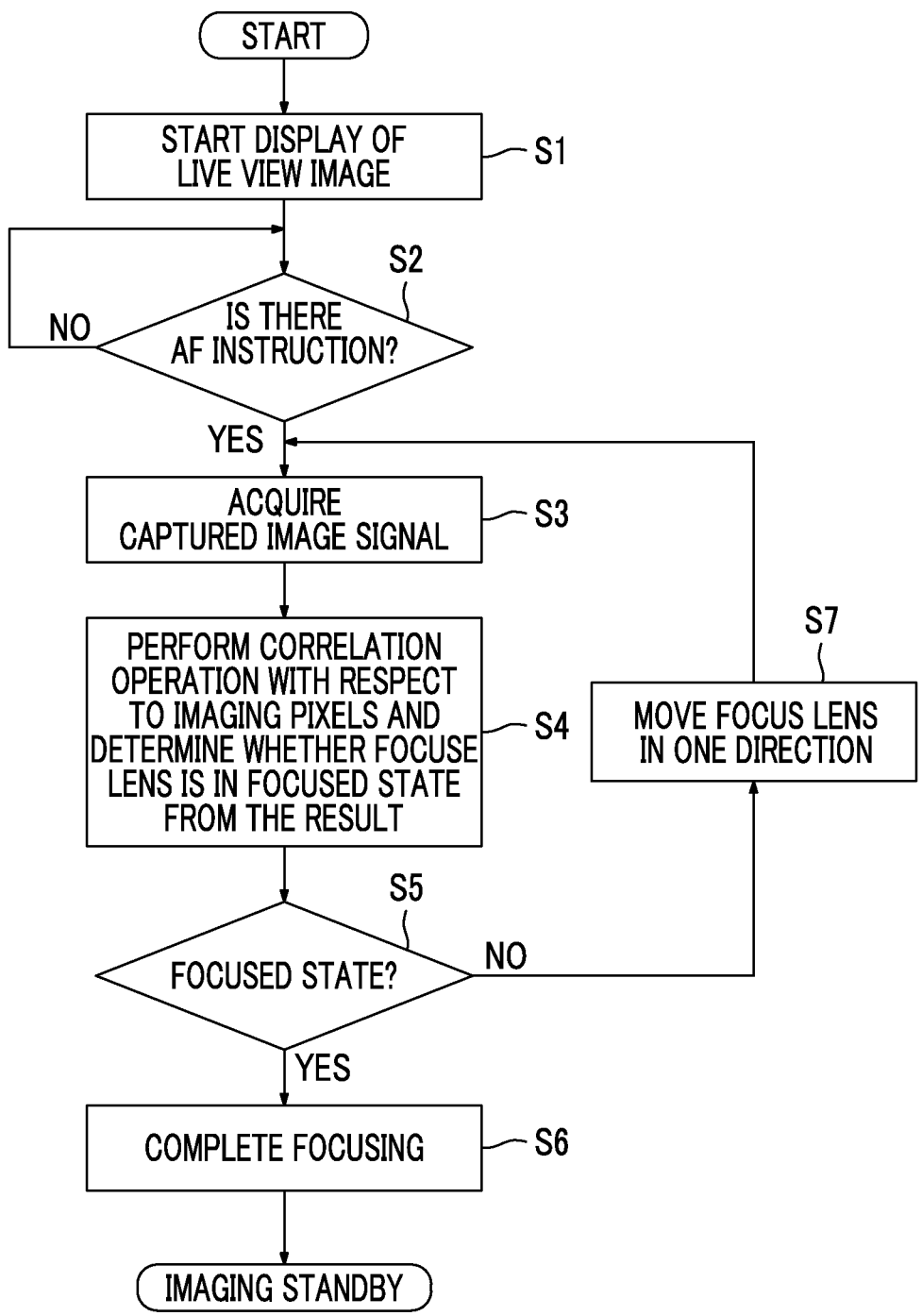
FIG. 6 is a flowchart illustrating an operation of the digital camera shown in FIG. 1.

FIG. 6 is a flowchart illustrating an auto-focus operation of the digital camera shown in FIG. 1.

If the digital camera is set to an imaging mode, the system control unit 11 starts display of a live view image (step S1).

Specifically, the system control unit 11 repeats a control for imaging a subject using the imaging element 5 and displaying an image based on captured image data obtained through the imaging on the display unit 23.

After the display of the live view image is started, if an execution instruction (hereinafter, referred to as an auto-focus execution instruction, which is represented as an AF instruction in the figure) of a focusing control of the imaging optical system is given according to a half-push operation or the like of a shutter button provided in the operation unit 14 (step S2: YES), the AF processing unit 19 acquires the latest image signals among captured image signals obtained when the auto-focus execution instruction is given (step S3).

The AF processing unit 19 performs a correlation operation of the detection signal group of the first signal detection unit group and the detection signal group of the second signal detection unit group set for each block in a selected AF area 53, among the captured image signals. Further, the AF processing unit 19 calculates a correlation value in the range H including the shift amount of 0 obtained as a result of the correlation operation, and determines whether the focus lens is in the focused state based on the size of the calculated distribution (step S4).

Specifically, if there are one or more blocks in which the distribution is equal to or larger than a threshold value TH1 which is a first threshold value, the AF processing unit 19 determines that the focus lens is in the focused state. If there is no block in which the distribution is equal to or larger than the threshold value TH1, the AF processing unit 19 determines that the focus lens is in a non-focused state.

In addition, as another method, a threshold value may be set in the number of blocks in which the distribution is equal to or larger than the threshold value TH1, and the AF processing unit 19 may determine that the focus lens is in the focused state if the number of blocks in which the distribution is equal to or larger than the threshold value TH1 is equal to or larger than the set threshold value and may determine that the focus lens is in the non-focused state if the number of blocks in which the distribution is equal to or larger than the threshold value TH1 is smaller than the set threshold value.

In the determination of step S4, if the AF processing unit 19 determines that the focus lens is in the non-focused state (step S5: NO), the system control unit 11 moves the focus lens by a predetermined amount in one direction (step S7). Further, in step S3, a captured image signal captured by the imaging element 5 after movement of the focus lens is acquired by the AF processing unit 19, and it is determined again whether the focus lens is in the focused state in step S4.

In the determination of step S4, if the AF processing unit 19 determines that the focus lens is in the focused state (step S5: YES), the system control unit 11 stops the movement of the focus lens, sets a current position of the focus lens as a focusing position, and then, completes auto focusing (step S6).

As described above, according to the digital camera shown in FIG. 1, it is possible to perform auto focusing without using phase difference detection pixels. Thus, it is not necessary to perform a process of generating detection signals of phase difference detection pixels in an interpolating manner, and it is possible to enhance imaging quality, to reduce time until captured image data is generated, and to save energy due to reduction in interpolation computation. Further, it is possible to realize the imaging element 5 at a low cost, and thus, to reduce a manufacturing cost of the digital camera.

Further, according to the digital camera in FIG. 1, it is possible to determine whether the focus lens is in the focused state without using detection signals of all the pixels 51 in the AF area 53. Thus, for example, by performing a driving operation for reading detection signals from only the first signal detection unit group and the second signal detection unit group in the AF area 53 in a thinning-out manner, it is possible to reduce time until auto focusing is completed, and thus, to achieve high speed auto focusing.

Further, in the digital camera shown in FIG. 1, the system control unit 11 moves the focus lens until it is determined that the focus lens is in the focused state by the AF processing unit 19, and completes auto focusing when it is determined that the focus lens is in the focused state. Thus, compared with a method for moving the focus lens until a peak of a contrast evaluation value is detected and then returning the focus lens to a position corresponding to the peak to complete auto focusing, it is possible to reduce wasteful movement of the focus lens, and to achieve high speed auto focusing with low power consumption.

In the contrast AF method, since a point where a sum of differences between detection signals of adjacent pixels becomes a maximum is searched for to be set as a focused state, an operation of moving the focus lens to pass through a focusing position and returning the focus lens to the focusing position and an operation of searching for a position where a contrast value becomes a maximum are performed.

On the other hand, in the digital camera shown in FIG. 1, it is not necessary to perform an operation of moving the focus lens to pass through the focusing position and returning the focus lens to the focusing position, and to achieve high speed focusing. This is because the position of the focus lens where the distribution of the correlation values is generated is in a narrow range in the vicinity of the focusing position and a place where the distribution of the correlation values exceeds a threshold value may be used as the focusing position without practical problems.

In this embodiment, it is necessary to repeat a correlation operation while moving the focus lens, but a shift amount that causes a distribution in correlation values is in a relatively narrow range, and thus, its computation becomes small. This is because even if correlation values are calculated by increasing a shift amount, it is difficult to determine whether the focus lens is in a focused state by calculating the correlation values with respect to detection signals of different subjects.

For example, if a distance between the first signal detection unit group and the second signal detection unit group is set to two pixels, the range H of the shift amount may be about five times the distance. The range H of the shift amount may be determined in advance according to performance of a lens and imaging conditions. Thus, the range H of the shift amount and the threshold values TH1 and TH2 may be recorded in a memory in a camera or a memory in a lens in the case of an exchange type lens, in association with at least one of a lens model and imaging conditions, and may be read from the memory in imaging.

Hereinbefore, a configuration and a method in which the AF processing unit 19 determines that the focus lens is in a focused state in a case where a distribution of correlation values is large have been described. However, a case in which a distribution of correlation values becomes large even in a non-focused state due to noise or the like included in the detection signal group of the first signal detection unit group and the detection signal group of the second signal detection unit group may be considered.

Figure 7:
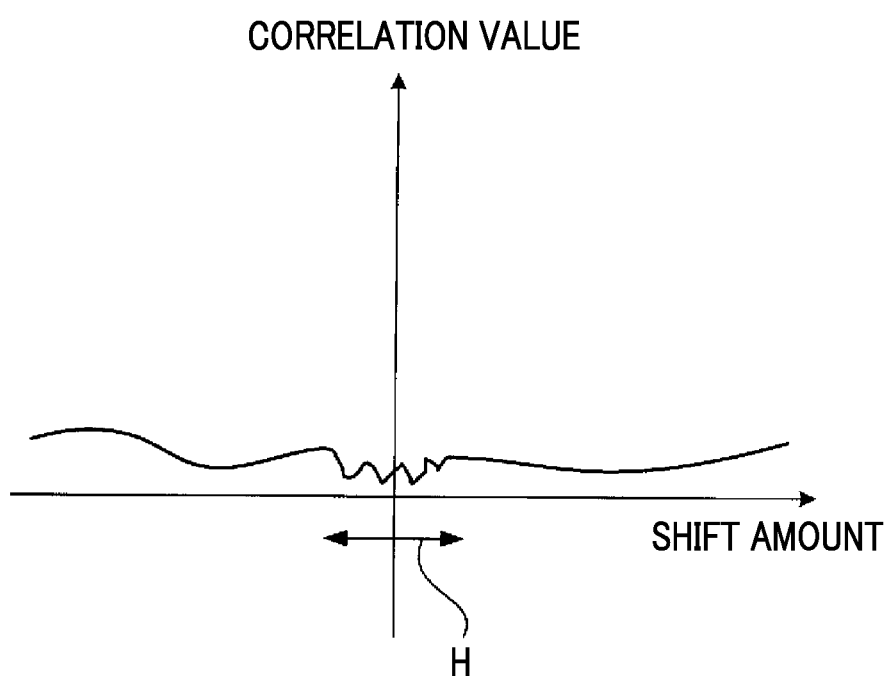
FIG. 7 is a diagram illustrating another example of a correlation operation result in a state where a focus lens is not at a focusing position.

FIG. 7 is a diagram illustrating another example of a result of a correlation operation with respect to the detection signal group of the first signal detection unit group and the detection signal group of the second signal detection unit group in a state (not-focused state) where the focus lens is not in the focused state.

In the example shown in FIG. 7, a distribution of correlation values in the range H is equal to or larger than the threshold value TH1. Thus, in the above-described determination method, it is determined that the case of FIG. 7 corresponds to a focused state.

A method for preventing such erroneous determination will be described.

As shown in FIGS. 5 and 7, in a non-focused state, a correlation value obtained from a result of a correlation operation transitions to a low value regardless of a shift amount. On the other hand, in a focused state, as shown in FIG. 4, in a range where an absolute value of a shift amount is small, a correlation value considerably changes with respect to a change in the shift amount.

The AF processing unit 19 calculates a difference Δ1 between a correlation value between a detection signal group of the first signal detection unit group and a detection signal group of the second signal detection unit group in a shift amount obtained by adding or subtracting the arbitrary amount to or from a shift amount corresponding to a minimum value among the correlation values obtained from the results of the correlation operations, and the minimum value. In the non-focused state, the difference Δ1 becomes a small value, but in the focused state, the difference Δ1 becomes a large value. Accordingly, even when a distribution of correlation values is large, if the difference Δ1 is small, the AF processing unit 19 may determine that the focus lens is in the non-focused state.

Figure 8:
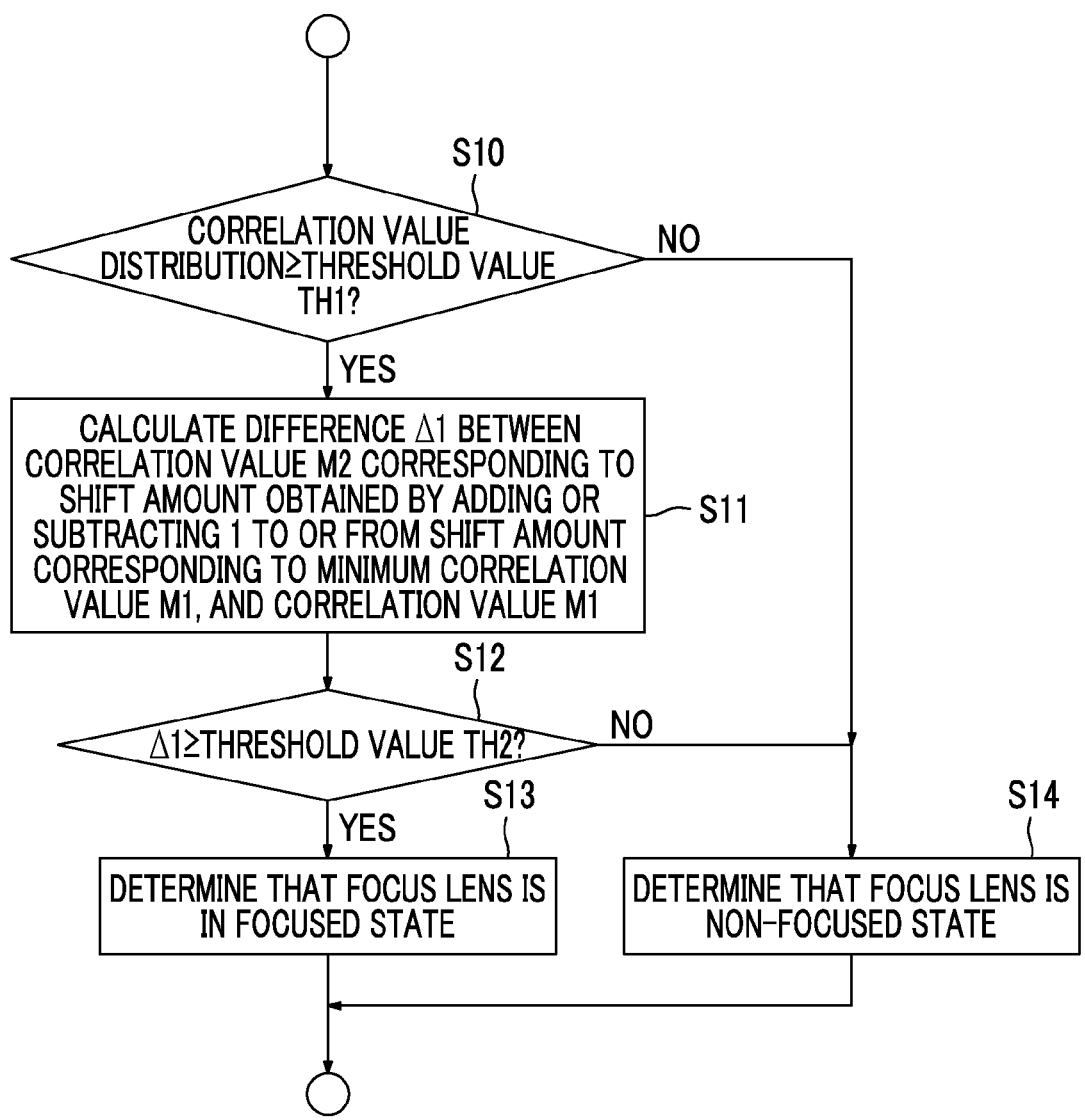
FIG. 8 is a flowchart illustrating a modification example of step S4 in FIG. 6.

FIG. 8 is a flowchart illustrating a modification example of step S4 in the flowchart of FIG. 6.

The AF processing unit 19 determines whether a distribution in the range H of correlation values obtained from results of correlation operations with respect to a detection signal group of the first signal detection unit group and a detection signal group of the second signal detection unit group is equal to or larger than the threshold value TH1 (step S10).

If the determination in step S10 is NO, the AF processing unit 19 determines that the focus lens is in a non-focused state (step S14).

If the determination in step S10 is YES, the AF processing unit 19 calculates a difference Δ1 between a correlation value M2 between a detection signal group of the first signal detection unit group and a detection signal group of the second signal detection unit group in a shift amount obtained by adding or subtracting 1 to or from a shift amount d corresponding to a minimum value M1 among correlation values obtained from the results of the correlation operations as the arbitrary amount, and the minimum value M1 (step S11).

If the difference Δ1 is equal to or larger than a threshold value TH2 which is a second threshold value (step S12: YES), the AF processing unit 19 determines that the focus lens in a focused state in step S13, and if the difference Δ1 is smaller than the threshold value TH2 (step S12: NO), the AF processing unit 19 determines that the focus lens is in a non-focused state in step S14.

As described above, according to the modification example of FIG. 8, since the AF processing unit 19 determines whether the focus lens is in the focused state based on the distribution of the correlation values and the difference Δ1, it is possible to enhance the accuracy of determination of whether the focus lens is in the focused state, and to enhance the accuracy of auto focusing.

Hereinbefore, a configuration and a method in which the AF processing unit 19 determines that the focus lens is in the focused state using the detection signal group of the first signal detection unit group and the detection signal group of the second signal detection unit have been described. Hereinafter, an example in which that the use of the detection signal group of the first signal detection unit group and the detection signal group of the second signal detection unit is the same as in the above-described configuration but its usage method is different therefrom will be described.

Figure 9:
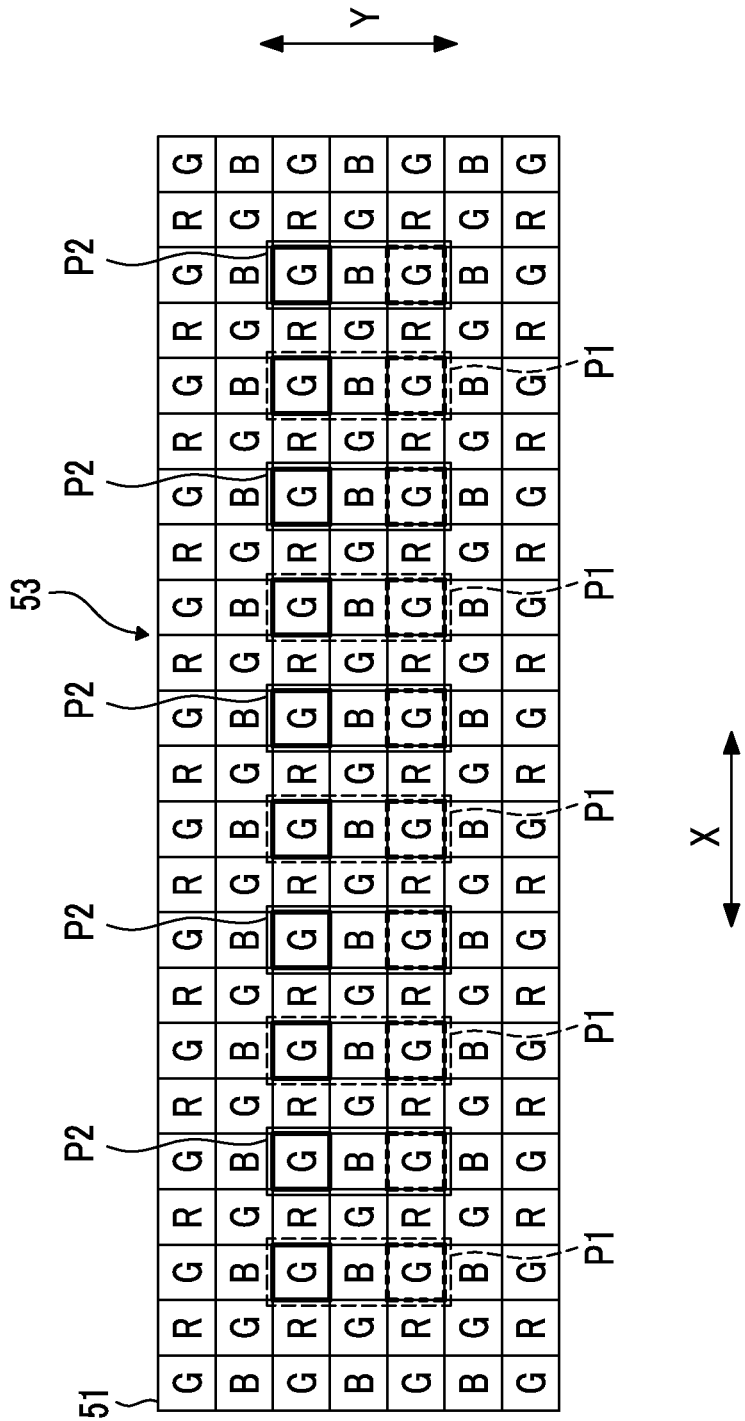
FIG. 9 is a diagram illustrating first pairs P1 and second pairs P2 set in the AF area 53.

FIG. 9 is a diagram illustrating one block of an AF area 53 of the imaging element 5. Here, the first signal detection unit group and the second signal detection unit group described in FIG. 3 are divided into first pairs P1 and second pairs P2.

The first pairs P1 correspond to a pair of a third signal detection unit group including plural pixels 51 (odd-numbered pixels 51 from the left end among pixels 51 surrounded by thick frames in FIG. 9) arranged at a predetermined pitch in the row direction X in the first signal detection unit group and a fourth signal detection unit group including pixels 51 (odd-numbered pixels 51 from the left end among pixels 51 surrounded by thick dotted-line frames in FIG. 9) arranged at the same distance in one direction with respect to the respective pixels 51 of the third signal detection unit group in the second signal detection unit group.

The second pairs P2 correspond to a pair of a fifth signal detection unit group including plural pixels 51 (even-numbered pixels 51 from the left end among pixels 51 surrounded by thick frames in FIG. 9) arranged at the same distance in one direction with respect to the respective pixels 51 of the third signal detection unit group in the first signal detection unit group and a sixth signal detection unit group including pixels 51 (even-numbered pixels 51 from the left end among pixels 51 surrounded by thick dotted-line frames in FIG. 9) arranged at the same distance in one direction with respect to the respective pixels 51 of the fifth signal detection unit group in the second signal detection unit group.

The AF processing unit 19 generates a first matching degree which is a matching degree of two images captured by the first pairs P1 using detection signals of the respective pixels 51 of the first pairs P1, and generates a second matching degree which is a second matching degree of two images captured by the second pairs P2 using detection signals of the respective pixels 51 of the second pairs P2. Further, the AF processing unit 19 determines whether the focus lens is in a focused state based on a result of comparison of the generated first matching degree and second matching degree.

Figure 10:
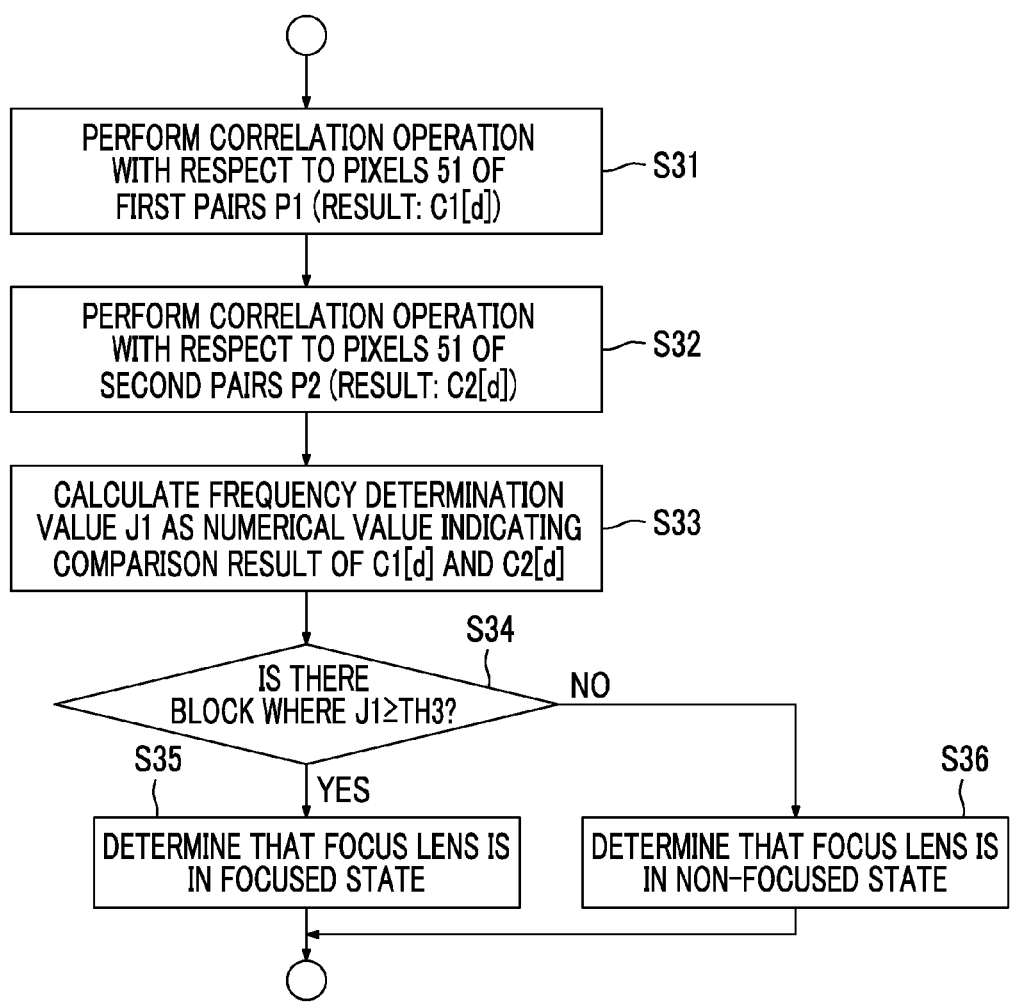
FIG. 10 is a flowchart illustrating a modification example of step S4 in FIG. 6.

FIG. 10 is a flowchart illustrating a modification example of step S4 in the flowchart of FIG. 6.

The AF processing unit 19 performs a correlation operation with respect to a detection signal group of the third signal detection unit group and a detection signal group of the fourth signal detection unit group, obtained from the first pairs P1 for each block in a selected AF area 53 (step S31).

Specifically, when data on one detection signal group is represented as A[1], . . . , A[k] and data on the other detection signal group is represented as B[1], . . . , B[k], an area C[d] surrounded by two data waveforms obtained by Expression (1) when the two pieces of data are shifted by a shift amount "d" is calculated.

Hereinafter, a result of the correlation operation in step S31 is represented as C1[$d$]. The correlation operation result C1[$d$] becomes a value indicating the first matching degree which is a matching degree of images captured by the third signal detection unit group and the fourth signal detection unit group of the first pairs P1.

Subsequently, the AF processing unit 19 performs a correlation operation with respect to a detection signal group of a fifth signal detection unit group and a detection signal group of a sixth signal detection unit group, obtained from the second pairs P2, for each block (step S32).

A result of the correlation operation is represented as C2[d]. The correlation operation result C2[d] becomes a value indicating the second matching degree which is a matching degree of images captured by the fifth signal detection unit group and the sixth signal detection unit group of the second pairs P2.

In a case where a frequency of a subject image formed in an arbitrary block is low, when the transverse axis represents a shift amount d and the longitudinal axis represents C[d], shapes of graphs become approximately the same with respect to C1[d] and C2[d]. However, in a case where the frequency of the subject image formed in the arbitrary block is high, the shapes of the graphs become considerably different from each other with respect to C1[d] and C2[d].

The AF processing unit 19 compares the shape of the graph based on C1[d] with the shape of the graph based on C2[d], to generate a frequency determination value J1 for determining the sizes of the frequencies of the subject images captured by the first pairs P1 and the second pairs P2.

Specifically, the AF processing unit 19 performs an operation of the following Expression (2) to generate the frequency determination value J1 as a numerical value indicating the comparison result of the correlation operation result C1[d] and the correlation operation result C2[d] (step S33).

$$J1 = \frac{\sum_{d=-L}^{L} |C1[d] - C2[d]|}{\sum_{d=-L}^{L} C1[d] + \sum_{d=-L}^{L} C2[d]} \quad (2)$$

A numerator of Expression (2) becomes a small value in a case where the shape of the graph based on C1[d] and the shape of the graph based on C2[d] are close to each other, and becomes a large value in a case where the two shapes are different from each other.

The AF processing unit 19 generates the frequency determination value J1 for each block in step S33, and then, compares the frequency determination value J1 for each block with a predetermined threshold value TH3. If there is a block where the frequency determination value J1 is equal to or larger than the threshold value TH3 (step S34: YES), it is possible to determine that a subject image formed in the selected AF area 53 is a sharp image including a high frequency component, and thus, it is determined that the focus lens is in a focused state (step S35).

Further, if there is no block where the frequency determination value J1 is equal to or larger than the threshold value TH3 (step S34: NO), the AF processing unit 19 can determine that the subject image formed in the selected AF area 53 is a blurred image, it is determined that the focus lens is in the non-focused state (step S36).

In this way, the AF processing unit 19 determines whether a high frequency component is included in a subject image formed in the AF area 53, based on a result (frequency determination value J1) of comparison between the first matching degree and the second matching degree, determines that the focus lens is in a focused state in a case where the high frequency component is included in the subject image, and determines that the focus lens is in a non-focused state in a case where the high frequency component is not included in the subject image.

As described above, according to the modification example of FIG. 10, computation of correlation operations with respect to the first pairs P1 and the second pairs P2 is reduced compared with that in the example of FIG. 6. Thus, by performing the correlation operation with respect to the first pairs P1 and the correlation operation with respect to the second pairs P2 in parallel, it is possible to determine whether the focus lens is in a focused state at high speed, compared with the example of FIG. 6.

In the modification example described in FIG. 10, it is determined whether the focus lens is in a focused state according to whether a subject image includes a high frequency component. Hereinafter, another method for determining whether a subject image includes a high frequency component will be described.

Figure 11A:
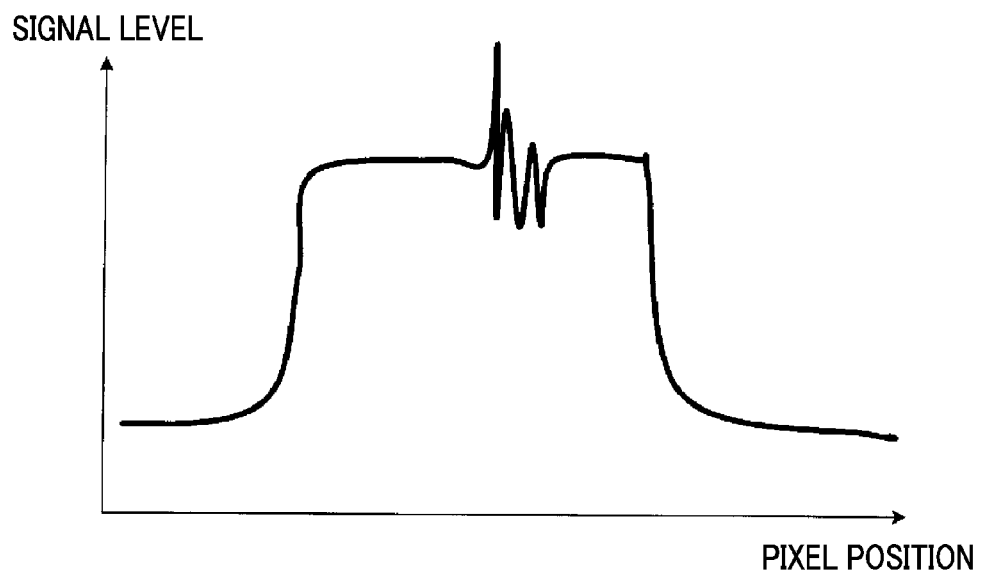
FIGS. 11A and 11B are diagrams illustrating detection signal waveforms of the first pairs P1 and the second pairs P2 when a high frequency component is included in a main subject image.
Figure 11B:
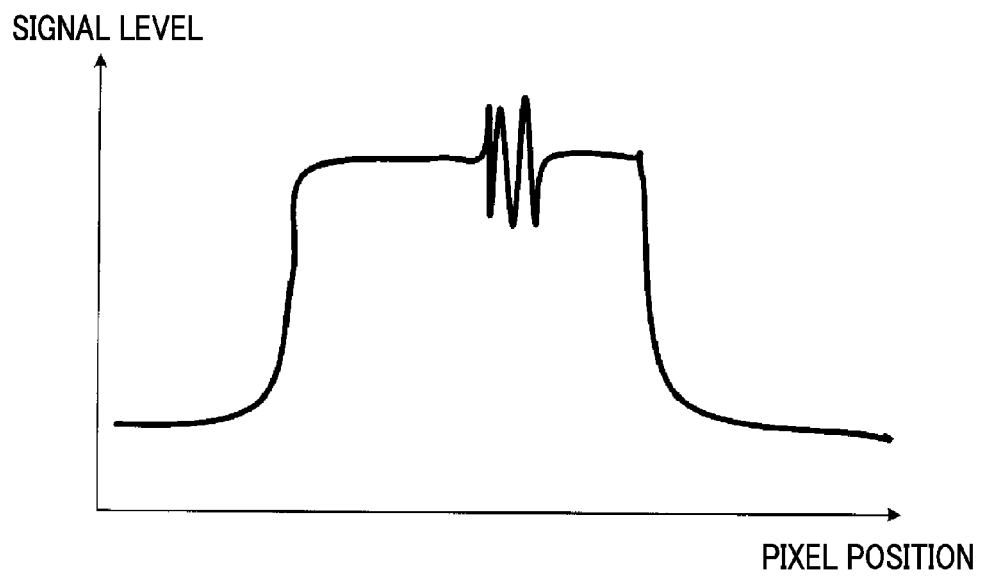

FIG. 11A is a diagram illustrating an example of detection signals of the third signal detection unit group of the first pairs P1 in FIG. 9. FIG. 11B is a diagram illustrating an example of detection signals of the fourth signal detection unit group of the first pairs P1 in FIG. 9.

The third signal detection unit group of the first pairs P1 and the fourth signal detection unit group of the first pairs P1 are spaced by two pixels in the column direction Y, and thus, capture approximately the same subject images.

However, if a high frequency part is locally present in a subject image formed in the first pairs P1, as shown in FIGS. 11A and 11B, a detection signal waveform of the third signal detection unit group of the first pairs P1 and a detection signal waveform of the fourth signal detection unit group of the first pairs P1 are approximately the same in a low frequency part, but are different from each other in the high frequency part.

The AF processing unit 19 shifts the waveform shown in FIG. 11A and the waveform shown in FIG. 11B with respect to each other in the row direction X, and calculates a correlation value which is an area surrounded by the two waveforms at respective shifted positions as the C1[d].

Figure 12:
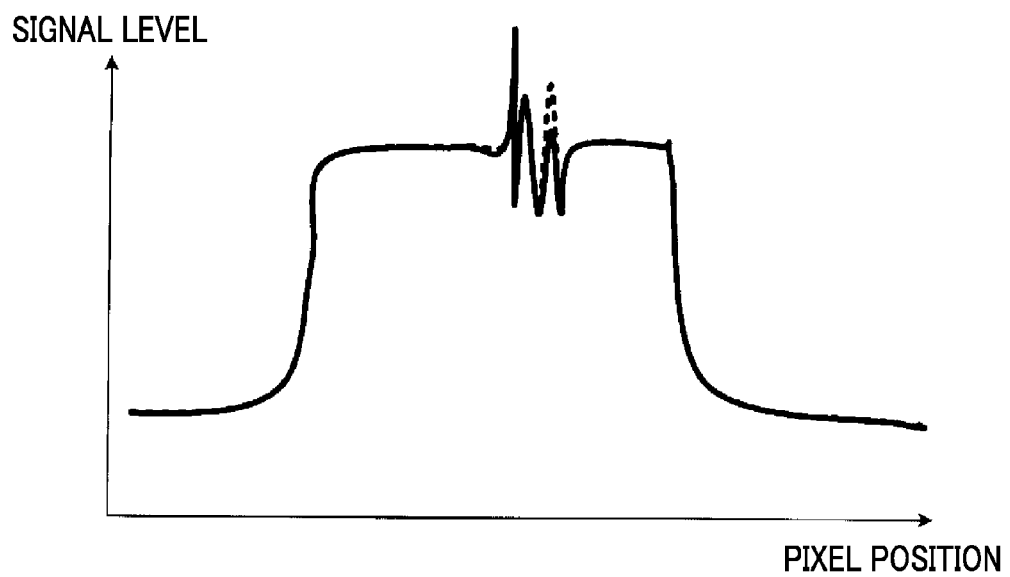
FIG. 12 is a diagram illustrating a positional relationship of waveforms when a correlation value becomes a minimum in the waveforms shown in FIG. 11.

FIG. 12 shows a positional relationship between the waveform shown in FIG. 11A and the waveform shown in FIG. 11B when the value of C1[d] becomes a minimum. As shown in FIG. 12, even when the value of C1[d] becomes a minimum, a matching degree of two data waveforms is low at a high frequency part (a part where a signal level finely varies in the figure).

Similarly, with respect to the second pairs P2, if a high frequency part is locally present in a subject image formed in the second pairs P2, a detection signal waveform of the fifth signal detection unit group of the second pairs P2 and a detection signal waveform of the sixth signal detection unit group of the second pairs P2 are approximately the same in a low frequency part, but are different from each other in the high frequency part. Accordingly, even when the value of C2[d] calculated by the AF processing unit 19 becomes a minimum, a matching degree of two data waveforms is low.

Figure 13:
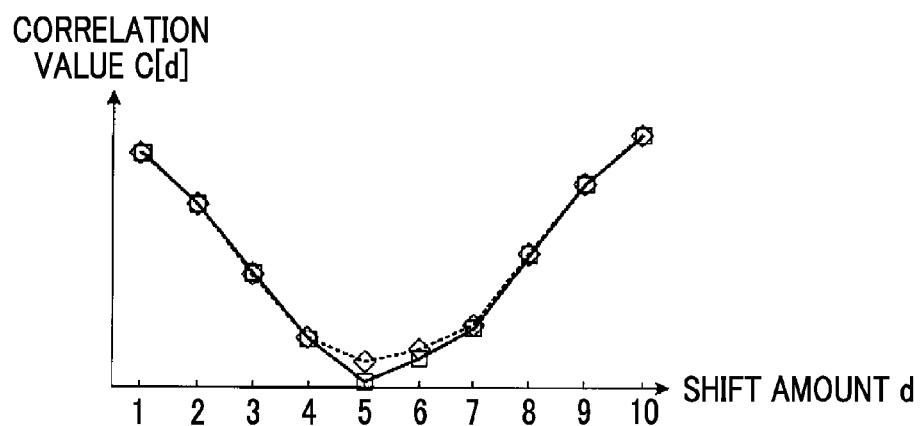
FIG. 13 is a diagram illustrating correlation operation results of the first pairs P1 and the second pairs P2 when a high frequency component is included in a main subject image.

FIG. 13 is a diagram illustrating correlation operation results of the first pairs P1 and the second pairs P2 when a high frequency part is included in subject images captured by the first pairs P1 and the second pairs P2. A graph indicated by a solid line in FIG. 13 represents the correlation operation result C1[d] of the first pairs P1, and a graph indicated by a dotted line in FIG. 13 represents the correlation operation result C2[d] of the second pairs P2.

Since the respective pixels 51 of the first pairs P1 and the respective pixels 51 of the second pairs P2 are adjacently arranged, the subject images captured by the first pairs P1 and the second pairs P2 are approximately the same. Thus, as shown in FIG. 13, even in a case where a high frequency part is locally included in the subject images captured by the first pairs P1 and the second pairs P2, the shapes of C1[d] and C2[d] approximately match each other as a whole. However, as described above, in a part where a correlation value becomes a minimum, a considerable difference occurs in C1[d] and C2[d] due to the influence of a difference of images due to the high frequency part.

It may also be considered that a high frequency part is formed in only one of images captured by the first pairs P1 and the second pairs P2, but even in this case, since one of a minimum value of C1[d] and a minimum value of C2[d] becomes small and the other one thereof becomes large, a considerable difference occurs therebetween.

From this review, the inventors found that in a case where a great difference occurs between the minimum value of C1[d] and the minimum value of C2[d], it is possible to determine that a high frequency part is included in subject images captured by the first pixel pairs P1 and the second pixel pairs P2.

That is, in step S4 of FIG. 6, the AF processing unit 19 may determine whether the focus lens is in the focused state based on a result of comparison between the minimum value of C1[d] and the minimum value of C2[d].

Figure 14:
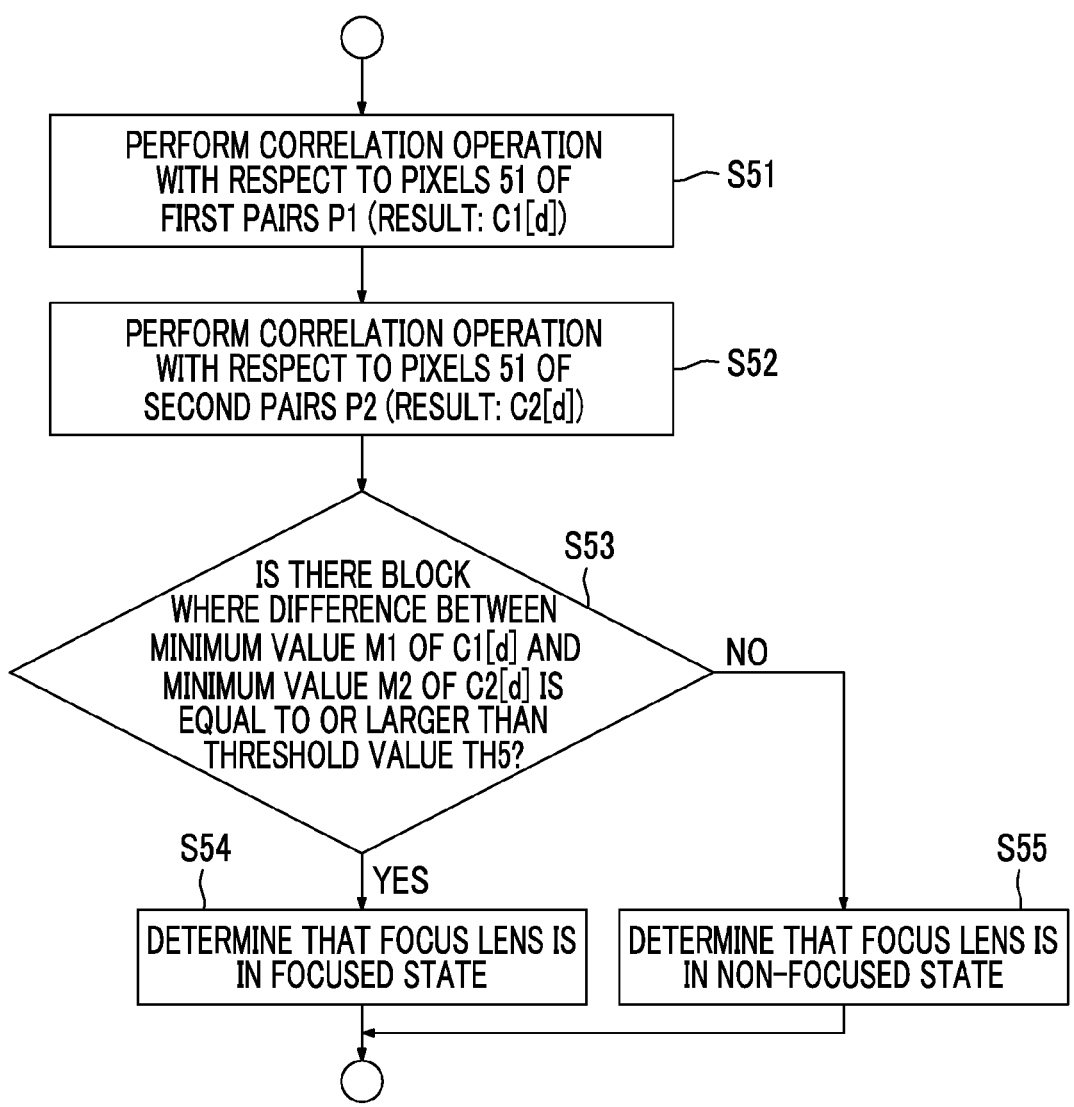
FIG. 14 is a flowchart illustrating a modification example of step S4 in FIG. 6.

FIG. 14 is a flowchart illustrating a modification example of the process of step S4 shown in FIG. 6.

The AF processing unit 19 performs a correlation operation with respect to detection signal groups of the third signal detection unit group and the fourth signal detection unit group of the first pairs P1 that form an arbitrary block (step S51). A result of the correlation operation in step S51 is C1[d].

Subsequently, the AF processing unit 19 performs a correlation operation with respect to detection signal groups of the fifth signal detection unit group and the sixth signal detection unit group of the second pairs P2 that form the arbitrary block (step S52). A result of the correlation operation in step S52 is C2[d].

Then, the AF processing unit 19 calculates a difference (absolute value) between a minimum value M1 of C1[d] calculated in step S51 and a minimum value M2 of C2[d] calculated in step S52. The AF processing unit 19 compares the difference calculated for each block with a threshold value TH5, and determines whether there is a block where the difference is equal to or larger than the threshold value TH5 (step S53).

If there is a block where |M1−M2|≥TH5 (step S53: YES), the AF processing unit 19 determines that a subject image formed in a selected AF area 53 includes a high frequency component, that is, that the focus lens is in a focused state (step S54).

If there is no block where |M1−M2|≥TH5 (step S53: NO), the AF processing unit 19 determines that the subject image formed in the selected AF area 53 does not include a high frequency component, that is, that the focus lens is in a non-focused state (step S55).

Here, M1 and M2 respectively represent the minimum values of C1[d] and C2[d], but an approximation function based on a known quadratic function or the like may be calculated using the correlation value C1[d] as a function of the shift amount d, and minimum values of the approximation function may be used as M1 and M2. In this case, the shift amount d in which a correlation value becomes a minimum may be a small value. Further, the shift amounts in which C1[d] and C2[d] become minimums may have different values.

As described above, according to the modification example of FIG. 14, since computation of correlation operations with respect to the respective pairs P1 and P2 is reduced compared with the example of FIG. 6, it is possible to achieve the same effects as in the modification example of FIG. 9.

In the above description, a configuration and a method in which the AF processing unit 19 determines whether a high frequency component is included in a subject image according to a magnitude relationship between |M1−M2| and the threshold value TH5 have been described. As its modification example, the ratio of M1 and M2 may be calculated as a comparison result of C1[d] and C2[d], and the determination may be performed according to a magnitude relationship between the ratio and the threshold value TH5.

Figure 16:
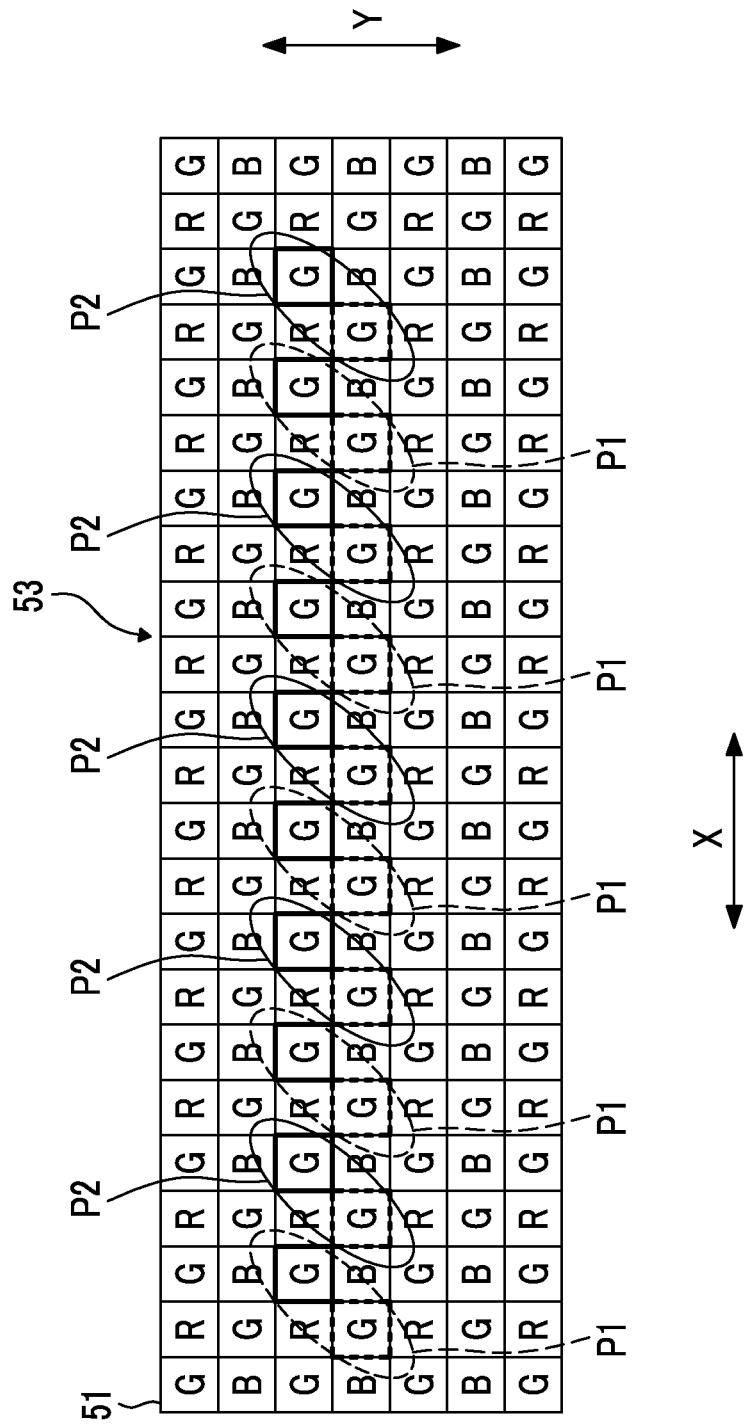
FIG. 16 is a diagram illustrating a modification example of setting of the first pairs P1 and the second pairs P2.

For example, when M1 among M1 and M2 has a larger value, in step S53 of FIG. 16, if (M1/M2) is equal to or larger than the threshold value TH5, the process of step S54 may be performed, and if (M1/M2) is smaller than the threshold value TH5, the process of step S55 may be performed.

Figure 15:
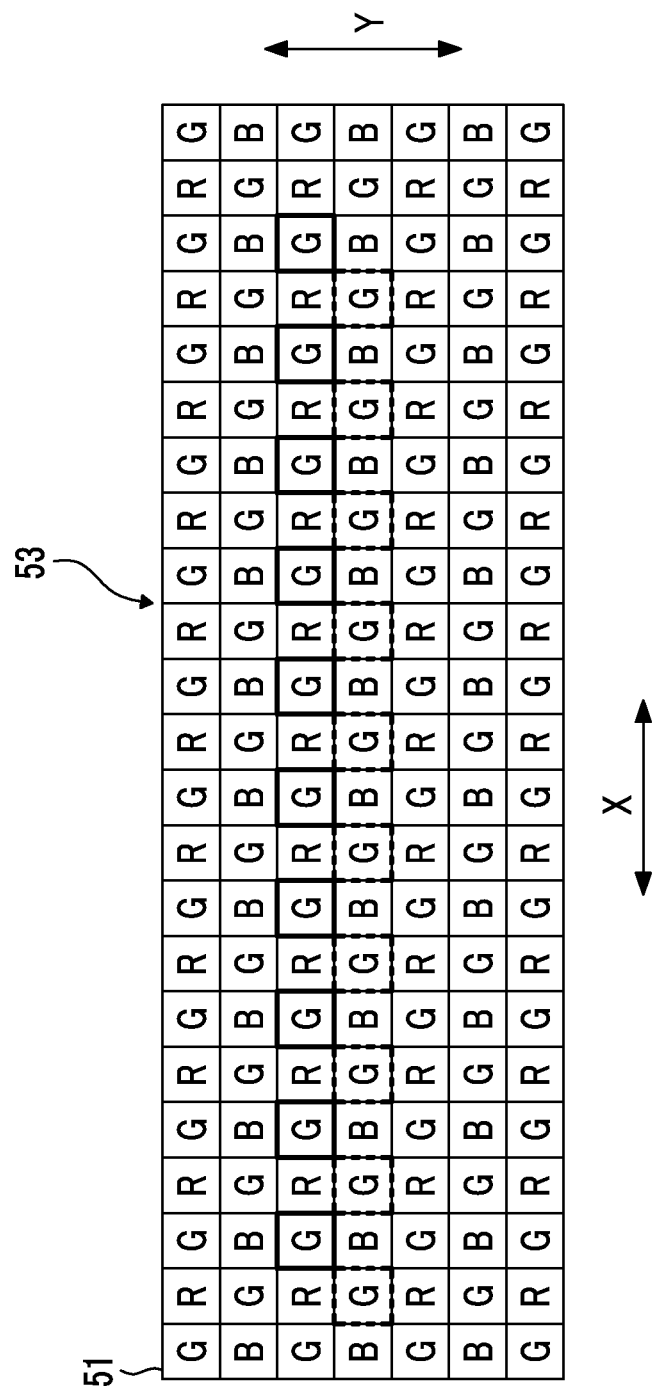
FIG. 15 is a diagram illustrating a modification example of setting of a first signal detection unit group and a second signal detection unit group.

FIG. 15 is a diagram illustrating a modification example of setting of a first signal detection unit group and a second signal detection unit group in a block included in an AF area 53 of the imaging element 5.

As shown in FIG. 15, G pixels 51 which are disposed to be closest to the respective pixels 51 of the first signal detection unit group on a lower left side thereof may be set as the second signal detection unit group. In a case where the setting is performed as shown in FIG. 15, the first pairs P1 and the second pairs P2 may be set as shown in FIG. 16.

According to the digital camera shown in FIG. 1, since it is possible to determine whether the focus lens is in a focused state without using phase difference detection pixels, it is possible to freely perform setting of the first signal detection unit group and the second signal detection unit group, and setting of the first pairs P1 and the second pairs P2. Accordingly, it is possible to perform a smooth focusing control according to a subject to be imaged. Further, with respect to an AF area, it is possible to freely set its size or position, and to realize a camera with excellent convenience.

In this embodiment, an example in which the digital camera is used as the imaging device is shown, but hereinafter, an embodiment in which a smart phone with a camera is used as the imaging device will be described.

Figure 17:
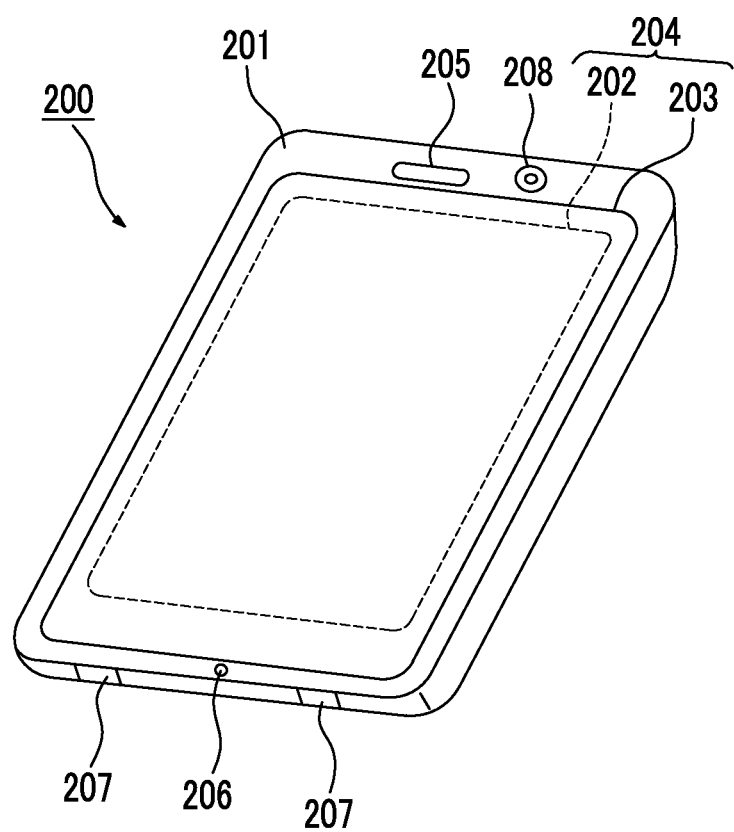
FIG. 17 is a diagram illustrating a smart phone which is an imaging device.

FIG. 17 is a diagram showing an appearance of a smart phone 200 which is an embodiment of the imaging device of the invention. The smart phone 200 shown in FIG. 17 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed. Further, the housing 201 includes a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 18:
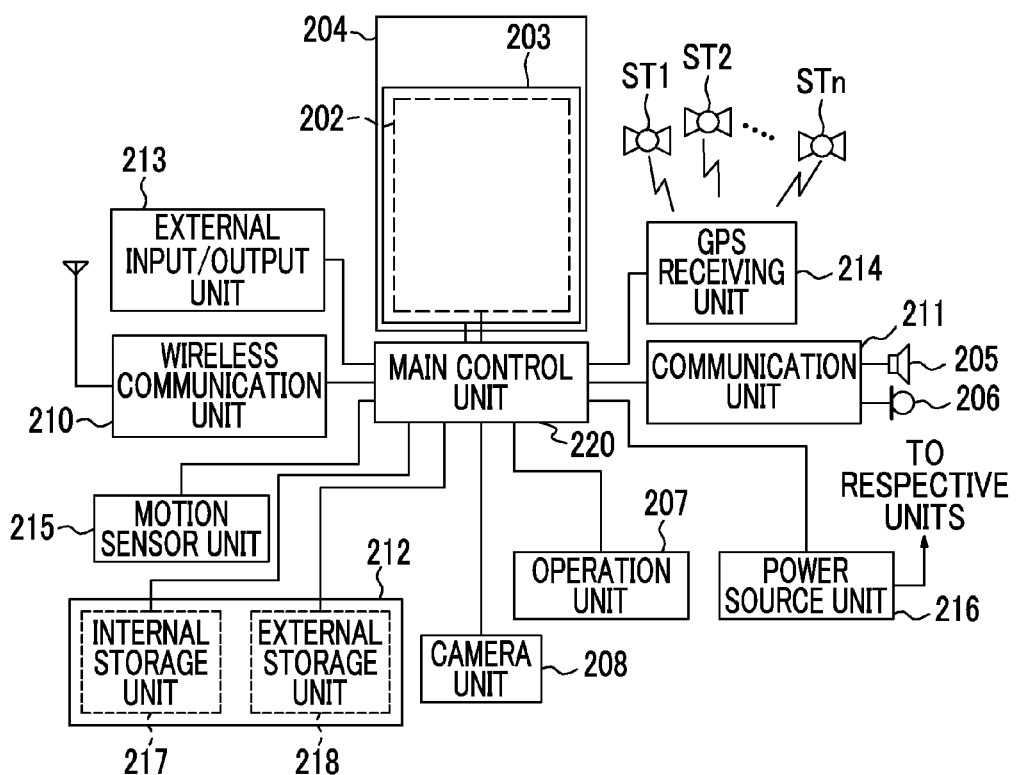
FIG. 18 is an internal block diagram illustrating the smart phone shown in FIG. 17.

FIG. 18 is a block diagram illustrating the configuration of the smart phone 200 shown in FIG. 17. As shown in FIG. 18, as main components of the smart phone, a wireless communication unit 210, the display input unit 204, a communication unit 211, the operation unit 207, the camera unit 208, a storage unit 212, an external input/output unit 213, a global positioning system (GPS) receiving unit 214, a motion sensor unit 215, a power source unit 216, and a main control unit 220 are provided. Further, as main functions of the smart phone 200, a wireless communication function for performing mobile wireless communication through a base station device BS (not shown) and a mobile communication network NW (not shown) is provided.

The wireless communication unit 210 performs wireless communication with respect to the base station device BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (a still image and a video image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OELD), or the like as a display device.

The operation panel 203 is a device that is mounted so that an image displayed on a display surface of the display panel 202 can be visually recognized and detects one or plural coordinates operated by a user's finger or a stylus. If the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 17, the display panel 202 and the operation panel 203 of the smart phone 200 shown as an example of the imaging device of the invention are integrated to form the display input unit 204, in which the operation panel 203 is arranged to completely cover the display panel 202.

In a case where such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like. Furthermore, as a position detecting method employed in the operation panel 203, any one of a matrix switch type, a resistive film type, a surface acoustic wave type, an infrared type, an electromagnetic induction type, an electrostatic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 17, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user. For example, as shown in FIG. 17, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable memory slot. Each of the respective internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As an external device to be connected to the smart phone 200, for example, a wired or wireless headset, a wired or wireless external charger, a wired or wireless data port, a memory card, a subscriber identity module (SIM) or a user identity module (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor unit 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source unit 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mail, a Web browsing function for browsing Web pages, or the like is used.

Further, the main control unit 220 has an image processing function, for example, for displaying an image on the display input unit 204 based on image data (data on a still image or a video image) such as received data or downloaded streaming data. The image processing function refers to a function for decoding the image data, performing image processing with respect to the decoded image data, and displaying an image on the display input unit 204, by the main control unit 220.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Furthermore, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

The main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1. The captured image data generated by the camera unit 208 may be recorded in the storage unit 212, or may be output through the input/output unit 213 or the wireless communication unit 210. In the smart phone 200 shown in FIG. 17, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203. Further, when detecting the position using the GPS receiving unit 214, it is possible to detect the position with reference to the image from the camera unit 208. In addition, it is possible to determine an optical axis direction or a current usage environment of the camera unit 208 of the smart phone 200 without using the triaxial acceleration sensor or by using the triaxial acceleration sensor together with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor unit 215, or the like may be added to the image data on a still image or a video image, and the result may be recorded in the storage unit 212, or may be output through the input/output unit 213 or the wireless communication unit 210.

In the smart phone 200 with the above-described configuration, similarly, by using the imaging element 5 as the imaging element of the camera unit 208, and by performing the processes shown in FIGS. 6, 8, 10, and 14 in the main control unit 220, it is possible to perform auto focusing without using phase difference detection pixels and without employing the contrast AF method.

As described above, this specification discloses the following content.

According to the disclosure, an imaging device comprises: an imaging element that includes an imaging surface where signal detection units that detect a signal based on a beam that passes through a pupil region of an imaging optical system that includes a focus lens are arranged in two dimensions in a row direction and a column direction that is orthogonal to the row direction; a focusing determination unit that determines whether the focus lens is in a focused state based on correlation values between a detection signal group of a first signal detection unit group that includes the plurality of signal detection units arranged in the row direction and a detection signal group of a second signal detection unit group that includes the signal detection units arranged at the same distance in one direction that crosses the row direction with respect to each of the plurality of signal detection units that forms the first signal detection unit group, in a state where the focus lens is at an arbitrary position, and based on a predetermined threshold value; and a focusing control unit that moves the focus lens until it is determined by the focusing determination unit that the focus lens is in the focused state.

In the disclosed imaging device, the focusing determination unit may calculate the correlation values between the detection signal group of the first signal detection unit group and the detection signal group of the second signal detection unit group while shifting the detection signal group of the first signal detection unit group and the detection signal group of the second signal detection unit group by an arbitrary amount in the row direction, and may determine whether the focus lens is in the focused state by comparing a distribution of a plurality of correlation values corresponding to a range including a shift amount of 0 in the detection signal group of the first signal detection unit group and the detection signal group of the second signal detection unit group, among the calculated correlation values, with the threshold value.

In the disclosed imaging device, the threshold value may include a first threshold value and a second threshold value, and the focusing determination unit may calculate a difference between a correlation value between the detection signal group of the first signal detection unit group and the detection signal group of the second signal detection unit group, in a shift amount obtained by adding or subtracting the arbitrary amount to or from the shift amount corresponding to a minimum value among the calculated correlation values, and the minimum value, and may determine whether the focus lens is in the focused state based on a result of comparison between the distribution and the first threshold value and a result of comparison between the difference and the second threshold value.

In the disclosed imaging device, the focusing determination unit may calculate a first matching degree which is a matching degree of two images captured by a first pair of a third signal detection unit group that includes the plurality of signal detection units arranged in the row direction in the first signal detection unit group and a fourth signal detection unit group that includes the signal detection units arranged at the same distance in one direction with respect to each of the signal detection units of the third signal detection unit group in the second signal detection unit group by a correlation operation with respect to detection signal groups respectively output from the two signal detection unit groups that form the first pair, may calculate a second matching degree which is a matching degree of two images captured by a second pair of a fifth signal detection unit group that includes the plurality of signal detection units arranged at the same distance in one direction with respect to each of the signal detection units of the third signal detection unit group in the first signal detection unit group and a sixth signal detection unit group that includes the signal detection units arranged at the same distance in one direction with respect to each of the signal detection units of the fifth signal detection unit group in the second signal detection unit group by a correlation operation with respect to detection signal groups respectively output from the two signal detection unit groups that form the second pair, and may generate a frequency determination value for determining the sizes of frequencies of subject images captured by the first pair and the second pair from the first matching degree and the second matching degree, and determines whether the focus lens is in the focused state by comparing the frequency determination value with the threshold value.

In the disclosed imaging device, the focusing determination unit may perform a correlation operation with respect to detection signal groups in a first pair of a third signal detection unit group that includes the plurality of signal detection units arranged in the row direction in the first signal detection unit group and a fourth signal detection unit group that includes the signal detection units arranged at the same distance in one direction with respect to each of the signal detection units of the third signal detection unit group in the second signal detection unit group, may perform a correlation operation with respect to detection signal groups in a second pair of a fifth signal detection unit group that includes the plurality of signal detection units arranged at the same distance in one direction with respect to each of the signal detection units of the third signal detection unit group in the first signal detection unit group and a sixth signal detection unit group that includes the signal detection units arranged at the same distance in one direction with respect to each of the signal detection units of the fifth signal detection unit group in the second signal detection unit group, and may determine whether the focus lens is in the focused state by comparing a difference or a ratio between a first correlation value which is a minimum correlation value between the detection signal groups of the first pair, obtained from a result of the correlation operation with respect to the first pair, and a second correlation value which is a minimum correlation value between the detection signal groups of the second pair, obtained from a result of the correlation operation with respect to the second pair with the threshold value.

According to the disclosure, a focusing control method in an imaging device including an imaging element that includes an imaging surface where signal detection units that detect a signal based on a beam that passes through a pupil region of an imaging optical system that includes a focus lens are arranged in two dimensions in a row direction and a column direction that is orthogonal to the row direction, comprises: a focusing determination step of determining whether the focus lens is in a focused state based on correlation values between a detection signal group of a first signal detection unit group that includes the plurality of signal detection units arranged in the row direction and a detection signal group of a second signal detection unit group that includes the signal detection units arranged at the same distance in one direction that crosses the row direction with respect to each of the plurality of signal detection units that forms the first signal detection unit group, in a state where the focus lens is at an arbitrary position, and based on a predetermined threshold value; and a focusing control step of moving the focus lens until it is determined in the focusing determination step that the focus lens is in the focused state.

INDUSTRIAL APPLICABILITY

The invention is applied to a digital camera or the like to provide high convenience and effectiveness.

EXPLANATION OF REFERENCES

1: imaging lens
2: diaphragm

5: imaging element
11: system control unit (focusing control unit)
19: AF processing unit (focusing determination unit)
50: imaging surface
51: pixel
53: AF area

What is claimed is:

1. An imaging device comprising:
an imaging element that includes some pixels in a plurality of pixels, the plurality of pixels output captured image signals, and the some pixels of the plurality of pixels output captured image signals and are used as signal detection pixels that detect a signal based on a beam that passes through a pupil region of an imaging optical system that includes a focus lens, and wherein the signal detection pixels are arranged in two dimensions in a row direction and a column direction that is orthogonal to the row direction; and
a processor configured to:
determine whether the focus lens is in a focused state based on correlation values between a detection signal group of a first signal detection pixel group that includes a plurality of signal detection pixels arranged in the row direction and a detection signal group of a second signal detection pixel group that includes the signal detection pixels arranged at the same distance in one direction that crosses the row direction with respect to each of a plurality of signal detection pixels that forms the first signal detection pixel group, in a state where the focus lens is at an arbitrary position, and based on a predetermined threshold value, and
move the focus lens until the focus lens is in the focused state is determined by the processor;
wherein the processor calculates the correlation values between the detection signal group of the first signal detection pixel group and the detection signal group of the second signal detection pixel group while shifting the detection signal group of the first signal detection pixel group and the detection signal group of the second signal detection pixel group by an arbitrary amount in the row direction, and determines whether the focus lens is in the focused state by comparing a distribution of a plurality of correlation values corresponding to a range including a first shift amount of 0 in the detection signal group of the first signal detection pixel group and the detection signal group of the second signal detection pixel group, among the calculated correlation values, with the predetermined threshold value.

2. The imaging device according to claim 1,
wherein the predetermined threshold value includes a first threshold value and a second threshold value, and
wherein the processor calculates a difference between a correlation value between the detection signal group of the first signal detection pixel group and the detection signal group of the second signal detection pixel group, in a second shift amount obtained by adding or subtracting the arbitrary amount to or from the first shift amount corresponding to a minimum value among the calculated correlation values, and the minimum value, and determines whether the focus lens is in the focused state based on a result of comparison between the distribution and the first threshold value and a result of comparison between the difference and the second threshold value.

3. The imaging device according to claim 1,
wherein the processor calculates a first matching degree which is a matching degree of two images captured by a first pair of a third signal detection pixel group that includes the plurality of signal detection pixels arranged in the row direction in the first signal detection pixel group and a fourth signal detection pixel group that includes the signal detection pixels arranged at the same distance in one direction with respect to each of the signal detection pixels of the third signal detection pixel group in the second signal detection pixel group by a correlation operation with respect to detection signal groups respectively output from two signal detection pixel groups that form the first pair, calculates a second matching degree which is a matching degree of two images captured by a second pair of a fifth signal detection pixel group that includes the plurality of signal detection pixels arranged at the same distance in one direction with respect to each of the signal detection pixels of the third signal detection pixel group in the first signal detection pixel group and a sixth signal detection pixel group that includes the signal detection pixels arranged at the same distance in one direction with respect to each of the signal detection pixels of the fifth signal detection pixel group in the second signal detection pixel group by a correlation operation with respect to detection signal groups respectively output from the two signal detection pixel groups that form the second pair, generates a frequency determination value for determining the sizes of frequencies of subject images captured by the first pair and the second pair from the first matching degree and the second matching degree, and determines whether the focus lens is in the focused state by comparing the frequency determination value with the predetermined threshold value.

4. The imaging device according to claim 1,
wherein the processor performs a correlation operation with respect to detection signal groups in a first pair of a third signal detection pixel group that includes the plurality of signal detection pixels arranged in the row direction in the first signal detection pixel group and a fourth signal detection pixel group that includes the signal detection pixels arranged at the same distance in one direction with respect to each of the signal detection pixels of the third signal detection pixel group in the second signal detection pixel group, performs a correlation operation with respect to detection signal groups in a second pair of a fifth signal detection pixel group that includes the plurality of signal detection pixels arranged at the same distance in one direction with respect to each of the signal detection pixels of the third signal detection pixel group in the first signal detection pixel group and a sixth signal detection pixel group that includes the signal detection pixels arranged at the same distance in one direction with respect to each of the signal detection pixels of the fifth signal detection pixel group in the second signal detection pixel group, and determines whether the focus lens is in the focused state by comparing a difference or a ratio between a first correlation value which is a minimum correlation value between the detection signal groups of the first pair, obtained from a result of the correlation operation with respect to the first pair, and a second correlation value which is a minimum correlation value between the detection signal groups of the second pair, obtained from a result of the correlation operation with respect to the second pair with the threshold value.

5. A focusing control method in an imaging device including an imaging element that includes some pixels in a plurality of pixels, the plurality of pixels output captured image signals and the some pixels of the plurality of pixels output captured image signals and are used as signal detection pixels that detect a signal based on a beam that passes through a pupil region of an imaging optical system that includes a focus lens, and wherein the signal detection pixels are arranged in two dimensions in a row direction and a column direction that is orthogonal to the row direction, the method comprising:

a focusing determination step of determining whether the focus lens is in a focused state based on correlation values between a detection signal group of a first signal detection pixel group that includes a plurality of signal detection pixels arranged in the row direction and a detection signal group of a second signal detection pixel group that includes the signal detection pixels arranged at the same distance in one direction that crosses the row direction with respect to each of a plurality of signal detection pixels that forms the first signal detection pixel group, in a state where the focus lens is at an arbitrary position, and based on a predetermined threshold value; and a focusing control step of moving the focus lens until the focus lens is in the focused state is determined in the focusing determination step;

wherein the correlation values between the detection signal group of the first signal detection pixel group and the detection signal group of the second signal detection pixel group are calculated while shifting the detection signal group of the first signal detection pixel group and the detection signal group of the second signal detection pixel group by an arbitrary amount in the row direction, and whether the focus lens is in the focused state is determined by comparing a distribution of a plurality of correlation values corresponding to a range including a first shift amount of 0 in the detection signal group of the first signal detection pixel group and the detection signal group of the second signal detection pixel group, among the calculated correlation values, with the predetermined threshold value.

6. The imaging device according to claim 1, wherein the some pixels of the plurality of pixels being used as the signal detection pixels are any one of a R pixels, G pixels and B pixels.

* * * * *